Patented Apr. 17, 1951

2,548,883

UNITED STATES PATENT OFFICE 2,548,883

PROCESS OF REMOVING CARBON FROM CATALYST

Earl V. Harlow, Nutley, N. J., assignor to Koppers Company, Inc., Pittsburgh, Pa., a corporation of Delaware No Drawing. Application September 7, 1946, Serial No. 695,557

12 Claims. (Cl. 260—681)

This invention relates to catalytic processes in which a catalyst inactivated by carbon deposits is reactivated by burning off the deposited carbon and is particularly directed to processes for facilitating the reactivation of such inactivated catalysts in which the heat requirements for the reactivation are supplied by transfer of heat to and from a heat transfer fluid which when the catalysis is carried out under normal operating conditions has insufficient capacity to raise the catalyst mass to a temperature high enough to effect the desired reactivation without supplying additional heat thereto from another source.

In the manufacture of butadiene from alcohol it is customary to pass a mixture of alcohol and acetaldehyde, of which the latter is obtained by the oxidation of alcohol or otherwise, over a butadiene-forming catalyst of suitable constitution. For this purpose silica gel activated with tantalum oxide ($Ta_2O_5$) as disclosed in U. S. application, Serial No. 460,120, filed September 29, 1942, now Patent 2,421,361, by Toussaint and Dunn as well as a mixture of iron and magnesium oxides activated and stabilized with copper oxide and potassium oxide as disclosed in U. S. Patent 2,395,985, have been successfully utilized in this process. A low ratio feed, that is to say, about three mols of alcohol for each mol of acetaldehyde is customarily used, although high ratio feeds (20 to 1) or even pure alcohol may be used with some catalysts. It is thought that the acetaldehyde first condenses to croton aldehyde which in turn is reduced to crotyl alcohol by the hydrogen donor compound, ethyl alcohol, and that the crotyl alcohol thus formed is dehydrated to 1,3-butadiene. Whatever the details of the process or whatever its mechanism, the feed mixture is continuously passed over the catalyst under appropriate conditions until the catalyst has become so inactivated that adequate production of butadiene is not obtained. The catalyst is then reactivated by heating to a temperature high enough to burn off the carbon deposit, thus completing a cycle. The catalyst is then ready to begin a new cycle. Each cycle consists of an onstream portion, catalysis, and an offstream portion, reactivation.

It is an object of this invention to provide improved processes of the character described, to facilitate reactivation of the catalyst, to obtain more uniform operation throughout catalysis, to avoid disadvantages of the prior art and to obtain advantages as will become apparent as the description proceeds.

These objects are accomplished in the present invention by carrying out the catalysis under normal operating conditions over a substantial proportion of the catalysis, thereafter near the end of the catalysis altering the operating conditions as required to effect an increased deposition of carbon and continuing operation under the changed conditions until carbon is deposited on the catalyst in an amount sufficient to supply the additional heat required during reactivation to raise the temperature of the catalyst mass high enough to effect the desired reactivation.

It has been thought heretofore that processes for the manufacture of butadiene from alcohol should be operated at atmospheric pressure or less for best results and that operation at superatmospheric pressure was unfeasible due to excessive carbon deposition on the catalyst and reduced conversion efficiency. I have now found, however, that unexpected advantages are obtained by effecting the catalysis in a heat exchange converter having insufficient heating capacity to heat the catalyst to the desired reactivation temperature, increasing the pressure near the end of the catalysis in order to increase the carbon deposited upon the catalyst and thereafter reactivating the catalyst in said heat exchange converter. Thus by the processes of the invention I am able to take advantage of increased carbon deposition due to increased pressure and at the same time to maintain a higher overall content of butadiene in the catalysate during the catalysis.

The first portion of the catalysis may be carried out at a relatively low pressure which may be at or near atmospheric in accordance with customary practice in the art or at superatmospheric in accordance with the Corson & Stahly application Serial No. 683,326, filed July 13, 1946.

It is customary to carry out the catalysis in the heat exchange converters in which temperature control is effected by circulating a heat transfer fluid in indirect heat exchange with the catalyst. Since the temperature necessary for reactivation is substantially higher than the temperature required for the catalysis, it has been necessary heretofore to select the heat transfer fluid in accordance with the required temperature of reactivation or to preheat the air used in the regeneration or otherwise to supply the additional heat required to bring the catalyst mass to the reactivation temperature.

In accordance with the present invention it is possible to select the heat transfer fluid with reference to the temperature of the catalysis even though when so selected the heat transfer fluid will not provide heating capacity sufficient by itself to raise the catalyst mass to the desired regeneration temperature. This is made possible in accordance with the present invention because the additional heat required to bring the catalyst mass to regeneration temperature is supplied by combustion of the increased deposit of carbon which is laid down in the operation at the increased pressure. To attain this advantage it is only necessary to increase the pressure, preferably without a corresponding increase in the rate of throughput, near the end of the onstream or catalysis portion of the cycle by a few pounds per square inch, say, by 10 pounds per square inch or more and carbon sufficient to make up the deficiency in heating capacity of the heat transfer fluid and sufficient to raise the temperature from the operating temperature of catalysis to the required temperature for reactivation will be laid down on the catalyst. It is desirable that this be effected only over the last 15%, and more up to 75% of the onstream or catalysis portion of the cycle if the activity of the catalyst at the beginning of the cycle is low, in order not objectionably to effect the overall efficiency of the process.

Increase of pressure during the catalysis without corresponding increase in the rate of throughput has the effect of compensating the decreased activity of the catalyst brought about by carbon deposition or other forms of inactivation which progressively takes place during the onstream or catalyst portion of the cycle. The effect of catalyst inactivation is to give a catalysate having less and less butadiene as the onstream or catalysis portion of the cycle progresses. This undesirably complicates the working up of the catalysate for the recovery of its butadiene content. It is possible in accordance with the invention so to regulate the pressure during the catalysis as to compensate, in part at least, this tendency of the butadiene content of the catalysate to drop off, and if desired, the pressure during the catalysis may be progressively increased at suitable intervals so as to maintain the butadiene content of the catalysate at a substantially constant value.

The invention may be more fully understood by reference to the following example in which the parts are by weight unless otherwise specified.

EXAMPLE I

A mixture of ethanol and acetaldehyde was fed through a multiple tube heat exchange converter charged with silica gel catalyst activated with 2% tantalum oxide at a temperature of 350° C. and under the conditions listed below in Tables I and II. The base pressure, that is, the pressure determined by the internal resistance of the system was 9 pounds per square inch gauge. The throughput was maintained constant throughout each cycle at the liquid hourly space velocity indicated in the tables.

Table I

Feed rate—0.40 volume per volume of catalyst per hour
Total on-stream time—120 hours per cycle.

| Hours on stream after last reactivation | Per cent acetaldehyde in feed | Pressure on converter, p. s. i. gage | Per cent butadiene in product gases |
|---|---|---|---|
| 3 | 25.8 | 9.0 | 9.0 |
| 29 | 26.2 | 9.0 | 9.1 |
| 50 | 26.3 | 9.0 | 8.4 |
| 71 | 25.8 | 9.0 | 7.6 |
| 98 | 25.7 | 9.0 | 6.9 |

Table II

Feed rate—0.42 volume per volume of catalyst per hour
Total on-stream time—110 hours per cycle.

| Hours on stream after last reactivation | Per cent acetaldehyde in feed | Pressure on converter, p. s. i. gage | Per cent butadiene in product gases |
|---|---|---|---|
| 4 | 26.2 | 9.0 | 8.2 |
| 30 | 25.8 | 9.0 | 8.6 |
| 50 | 26.7 | 12.0 | 8.7 |
| 72 | 26.2 | 17.0 | 8.4 |
| 98 | 25.8 | 21.0 | 8.2 |

The pressure was increased on the 47th, 69th and 95th hours.

From the data given in the above tables it will be observed that operating at the base pressure of the system the content of butadiene in the catalysate gradually drops off after the 29th hour. Beginning with the 29th hour, the rate of decrease of butadiene content is substantially linear. Table II shows the effect of increasing the pressure during the onstream or catalysis portion of the cycle. It will be observed that increasing the pressure 3 or 4 pounds per square inch gauge every 20 or 25 hours after the 30th hour resulted in a catalysate having a substantially constant butadiene content.

The apparatus in which the above example was carried out was heated with Dowtherm as the heat transfer fluid. Since the Dowtherm normally operates at about 350° C. for catalysis the additional carbon formed as a result of the increase in pressure is advantageously utilized in obtaining the desired temperatures of 400°–420° C. for the reactivation of the catalyst. Other advantages of the procedure are increased production, it being possible to produce from 10 to 20% more butadiene per cycle and to produce more butadiene per load on the distillation equipment in view of the increased content of butadiene in the catalysate as a result of increased pressure, and an increase in the capacity of the recycling compressors. Such compressors also run cooler because less work is done on any given mass of gas. A further advantage is that more of the unconverted alcohol and acetaldehyde can be condensed before being compressed and moreover can be condensed with less cooling water.

While I have described my invention with reference to a particular embodiment thereof, it will be understood that it is given by way of illustration only and that variation may be made therein without departing from the spirit and scope of the invention.

The invention is particularly applicable to processes operated at atmospheric pressure though, as above noted, may be applied to processes operated at subatmospheric or superatmospheric pressure. By atmospheric pressure processes, I mean those processes which are operated at the normal back pressure of the system without the provision of special pressure regulating apparatus. Inasmuch as the converters commonly used in the manufacture of butadiene from alcohol have relatively high back pressures, the normal operating pressure may be relatively high. For example, from the 9 pounds per square inch gauge of the example up to about 12 pounds per square inch gauge.

The amount of pressure increase may vary widely, though ordinarily relatively small increases, say in the order of from 25 to 100% of absolute operating pressure will ordinarily be found most desirable. Preferably, the total increase should be at least about 10 pounds per square inch gauge, although any increase tends to the accomplishment of the object of the invention. With smaller increases, however, the extent to which the objects of the invention are accomplished may not be significant. For atmospheric pressure operation it is desirable to increase the pressure during the catalysis part of the cycle to at least about 10 pounds per square inch gauge above the normal operating pressure, preferably to not more than about 25 pounds per square inch gauge.

The pressure may be increased at any time during the catalysis portion of the cycle. In order more fully to realize the objects of the invention, however, it is preferable that the pressure be not increased until a substantial portion of the catalysis portion of a cycle has been effected at the normal operating pressure of the system. Preferably, at least about the first 25% of the catalysis portion of a cycle should be effected at the normal operating pressure, and the pressure increased thereafter in accordance with the principles given above. Where the principal object is to deposit carbon to facilitate reactivation of the catalyst, the pressure suitably may be increased during the last 15% of the catalysis portion of the cycle only. In such a case the pressure suitably is increased to the desired value in a single step. When, however, the principal object is to compensate inactivation of the catalyst in order to improve the butadiene content of the catalysate, it is preferable to increase the pressure stepwise over at least the last 60% of the catalysis portion of a cycle.

The rate of throughput may be varied according to the particular process and according to the preference of the operator. Ordinarily a rate of throughput between 0.4 and 0.6 volume per volume of catalyst per hour will be found satisfactory. Where the principal object is to facilitate reactivation of the catalyst, the rate of throughput is not a significant factor. However, where the principal object is to compensate inactivation of the catalyst, the rate of throughput is significant. In such operation the rate of throughput preferably is maintained constant throughout the catalysis. It may, however, be varied without departing from the spirit and scope of the invention provided it is not increased an amount corresponding to the increase in pressure. Because the catalysis is effected in the vapor phase the contact time is a function of the rate of throughput and the pressure. If the pressure is increased and the rate of throughput correspondingly increased, the contact time will be the same. Inasmuch as the purpose of the increase in pressure is to increase the contact time and thereby to compensate the inactivation of the catalyst, it is desirable therefore that the rate of throughput be maintained substantially constant throughout the catalysis, or at least not increased an amount corresponding to the increase in pressure.

I claim:

1. In a process for making butadiene from alcohol involving catalysis and reactivation, the steps of effecting the catalysis in a heat exchange converter having insufficient heating capacity to heat the catalyst to the desired reactivation temperature, increasing the pressure near the end of the catalysis in order to increase the carbon deposited upon the catalyst and thereafter reactivating the catalyst in said heat exchange converter.

2. The process of claim 1 in which the pressure is increased at least 10 pounds per square inch over about the last 15% of the catalysis.

3. The process of claim 1 in which the pressure is initially substantially atmospheric and is increased over about the last 15% of the catalysis only by at least 10 pounds per square inch gauge.

4. In a process for catalysis in which the catalyst is inactivated by deposition of carbon and is reactivated by burning off the deposited carbon, the steps of effecting the catalysis in a heat exchange converter having insufficient heating capacity to heat the catalyst to the desired reactivation temperature, increasing the pressure near the end of the catalysis in order to increase the carbon deposited upon the catalyst and thereafter reactivating the catalyst in said heat exchange converter.

5. In a catalytic process involving catalysis and reactivation in which the heat requirements of the reactivation are satisfied by transfer of heat to and from a heat transfer fluid which, when the catalysis is carried out under normal operating conditions, has insufficient heat capacity to raise the catalyst mass to a temperature high enough to effect the desired reactivation without supplying additional heat thereto from another source, the steps of carrying out the catalysis under normal operating conditions over a substantial proportion of the catalysis, thereafter near the end of the catalysis altering the operating condtions as required to effect an increased deposition of carbon and continuing operation under the changed conditions until carbon is deposited on the catalyst in an amount sufficient to supply the additional heat required during reactivation to raise the temperature of the catalyst mass high enough to effect the desired reactivation.

6. In a process for making butadiene from alcohol involving catalysis and reactivation in which the heat requirements of the reaction are satisfied by transfer of heat to and from a heat transfer fluid which, when the catalysis is carried out under normal operating conditions, has insufficient heat capacity to raise the catalyst mass to a temperature high enough to effect the desired reactivation without supplying additional heat thereto from another source, the steps of carrying out the catalysis under normal operating conditions over a substantial proportion of the catalysis, thereafter near the end of the catalysis increasing the pressure whereby the rate of deposition of carbon is increased and continuing the operation under the increased pressure until carbon is deposited on the catalyst in an amount sufficient to supply the additional heat required during reactivation to raise the temperature of the catalyst mass high enough to effect the desired reactivation.

7. The process of claim 6 in which the pressure is increased at least 10 pounds per square inch over about the last 15% of the catalysis.

8. The process of claim 6 in which the normal operation is effected substantially at atmospheric pressure and the increase in pressure is at least about 10 pounds per square inch gauge over the last 15% of the catalysis.

9. The process of claim 5 in which the catalytic process is the making of butadiene from alcohol.

10. In a process for making butadiene from alcohol involving catalysis and reactivation in which the catalysis and reactivation is effected in indirect heat exchange with Dowtherm maintained at about 350° C. whereby when the catalysis is effected under normal operating conditions the amount of heat available for regenerating the catalyst is insufficient to raise the temperature of the catalytic mass high enough to effect the desired degree of activation and additional heat must be supplied from another source, the steps of carrying out catalysis under normal operating conditions over a substantial proportion of the catalysis, thereafter near the end of the catalysis raising the pressure whereby carbon is deposited at an increased rate and continuing the operation under the increased pressure until carbon is deposited on the catalyst in an amount sufficient, through its combustion, to supply the additional heat required during the regeneration, whereby to raise the temperature of the catalyst mass high enough to effect the desired degree of reactivation.

11. The process of claim 10 in which the pressure is increased at least about 10 pounds per square inch over about the last 15% of the catalysis.

12. The process of claim 10 in which the normal operation is effected substantially at atmospheric pressure and the increase in pressure is at least about 10 pounds per square inch gauge over the last 15% of the catalysis.

EARL V. HARLOW.

REFERENCES CITED

The following references are of record in the file of this patent:

UNITED STATES PATENTS

| Number | Name | Date |
| --- | --- | --- |
| 2,161,676 | Houdry | June 6, 1939 |
| 2,185,931 | Simpson | Jan. 2, 1940 |
| 2,374,433 | Ipatieff | Apr. 24, 1945 |

FOREIGN PATENTS

| Number | Country | Date |
| --- | --- | --- |
| 456,637 | Great Britain | Nov. 12, 1936 |

OTHER REFERENCES

Gamma et al., Chem. and Met., Dec. 1942 (pages 97–100).